United States Patent [19]

Hiraki

[11] Patent Number: 4,587,516

[45] Date of Patent: May 6, 1986

[54] PERSONAL SECURITY ALARM

[76] Inventor: Toshiro K. Hiraki, 2269 Plummer Ave., San Jose, Calif. 95125

[21] Appl. No.: 692,676

[22] Filed: Jan. 18, 1985

[51] Int. Cl.$^4$ ........................ G08B 1/08; G08B 13/00; H04Q 7/00

[52] U.S. Cl. .................................... 340/539; 128/903; 200/DIG. 2; 340/574

[58] Field of Search ........................ 340/574, 539, 573; 200/DIG. 2; 128/381, 782, 903

[56] References Cited

U.S. PATENT DOCUMENTS

| | | | |
|---|---|---|---|
| 3,478,344 | 11/1969 | Schwitzgebel et al. | 340/539 X |
| 4,074,269 | 2/1978 | Hartley | 340/539 X |
| 4,189,721 | 2/1980 | Doell | 340/539 |
| 4,404,549 | 9/1983 | Berg | 340/574 |

FOREIGN PATENT DOCUMENTS

| | | | |
|---|---|---|---|
| 2042230 | 9/1980 | United Kingdom | 340/574 |

*Primary Examiner*—Glen R. Swann, III
*Assistant Examiner*—Thomas J. Mullen, Jr.
*Attorney, Agent, or Firm*—Paul L. Hickman

[57] ABSTRACT

A personal security alarm characterized by a hand unit transmitter and a torso unit receiver/alarm. The transmitter of the hand unit is actuated by a button positioned at the palm of the user. As the user either voluntarily or involuntarily clutches his or her fist, the actuator button is depressed to energize the transmitter and cause the torso unit to emit a loud, penetrating alarm. The torso unit can only be turned off with a hidden switch.

19 Claims, 7 Drawing Figures

PERSONAL SECURITY ALARM

BACKGROUND OF THE INVENTION

1. Field of the Invention

This invention relates generally to electronic security systems, and more specifically to radio-activated alarm systems.

2. Description of the Prior Art

Personal security is becoming an ever greater concern for many individuals. The rising crime rate can make it unsafe for an individual to walk or jog alone in many regions of this country.

Some individuals carry a whistle, air horn, or other type of alarm on their person so that if they are attacked or accosted they can produce an audible alarm. A problem with whistles, horns, and the like is that they cannot always be utilized quickly enough in an emergency situation. For example, if an assailant approaches a victim from behind, the victim probably will not have enough time to locate and use a whistle or similar device.

Another approach to the problem of personal security has been to carry a small transmitter which transmits a distress signal to a base unit at some remote location. The base unit can then sound an alarm, call for the police, etc. An example of a prior art transmitter type alarm system is found in U.S. Pat. No. 4,121,160 of Cataldo which describes a miniature concealable radio alarm transmitter adapted to be worn around a user's neck. U.S. Pat Nos. 4,300,129, 4,157,540, 3,478,344 all teach belt mounted transmitters similar in design and concept to Cataldo's device.

A problem with the above cited devices is that they, like a whistle, may not be actuated in time if an individual is accosted without warning. For example, the device of Cataldo requires that a user grasp the alarm transmitter with his or her hand and exert a pressure on both sides of the transmitter case to close a pair of contacts. This would be particularly difficult to accomplish if the individual was grabbed from behind or in an arm lock.

Another problem with the remote transmission devices of the prior art is that the alarms are of the silent type, i.e. the alarm signal is remote from the individual who is in danger. Since the assailant is not startled by an immediate, audible alarm he or she may inflict greater damage upon their victim.

SUMMARY OF THE INVENTION

An object of this invention is to provide a personal security alarm which is activated as the result of a natural reflex action.

Another object of this invention is to provide a personal security alarm which produces an immediate, audible alarm at the scene of the crime.

Yet another object of this invention is to provide a personal security alarm which cannot be easily disabled by an assailant.

Yet another object of this invention is to provide a personal security alarm which is unobtrusive and uncumbersome.

Briefly, the invention includes a hand unit including a short range transmitter and an actuator button for activating the transmitter, and a torso unit including a receiver, a latch, and an alarm circuit. The hand unit is attached around the hand with the actuator button near the user's palm such that any reflexive or voluntary clenching of the fist will cause the transmitter to emit a radio frequency signal. The receiver in the torso unit is operative to detect the radio frequency signal of the hand unit and will trigger the latch to activate the alarm circuit.

A major advantage of this invention is that the alarm is triggered by a reflex action, i.e. the clutching of a fist in response to an attack. Thus, no conscious thought need to be given to activate the alarm.

Another advantage of this invention is the alarm will sound until it is disabled by a hidden switch.

Yet another advantage of this invention is that it does not interfere with the normal walking, jogging, etc. activities of the user. The hand unit is very light weight and unobtrusive, and the more massive torso unit is conveniently attached to the user's waist. Since no wires connect the hand unit to the torso unit, the user's movements are free and unrestricted.

These and other objects and advantages of the present invention will no doubt become apparent upon a reading of the following descriptions and a study of the several figures of the drawing.

Figures 1, 2, 3, 4, 5A, 5B, 6:
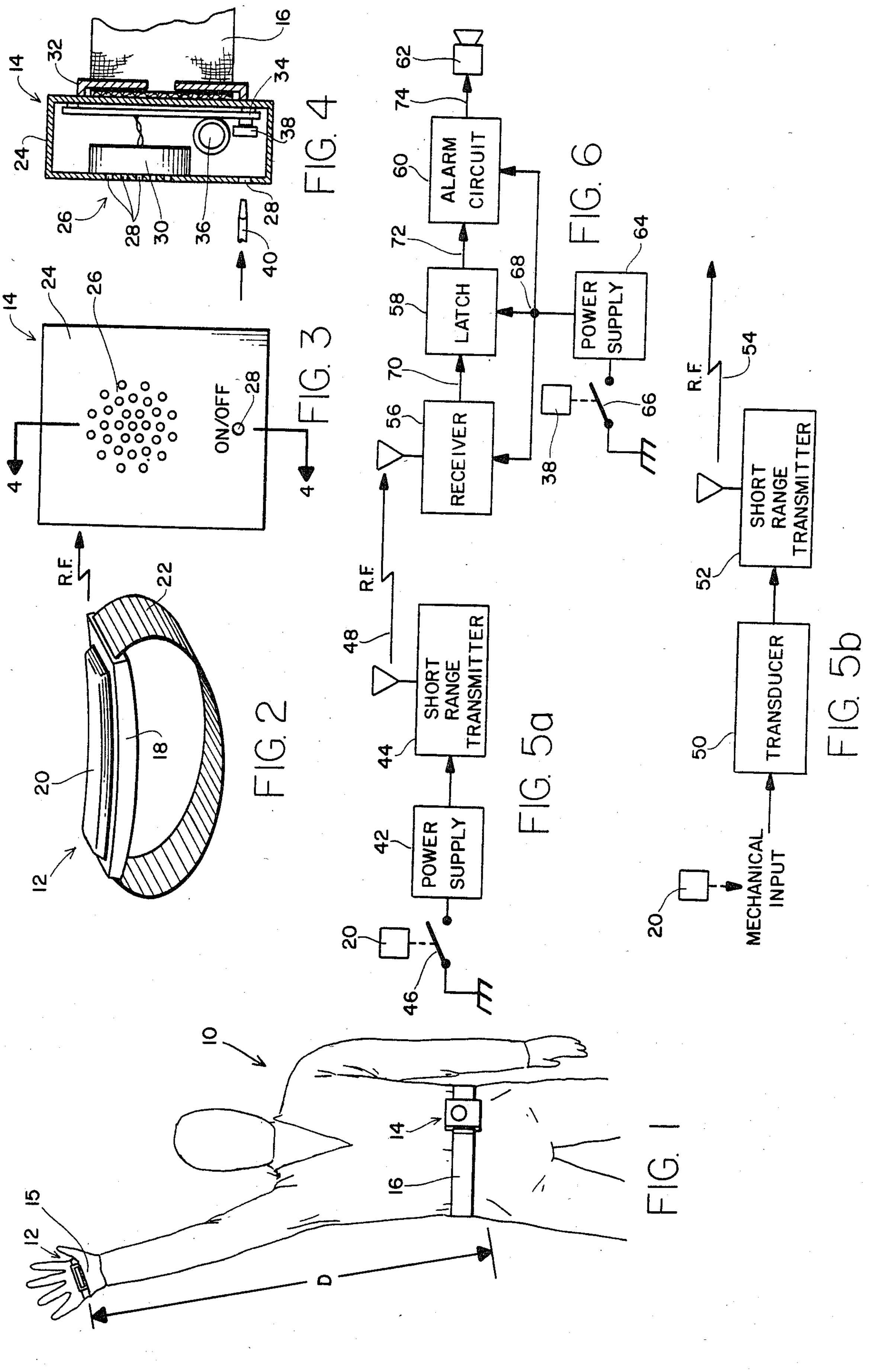
FIG. 1 is a pictorial view of the present invention being worn by an individual.
FIG. 2 is a perspective view of the hand unit of the present invention.
FIG. 3 is a front elevational view of the torso unit of the present invention.
FIG. 4 is a cross-sectional view taken along line 4—4 of FIG. 3.

FIG. *5a* is a block diagram of a short range transmitter in accordance with the present invention.

FIG. *5b* is a block diagram of another short range transmitter in accordance with the present invention.

FIG. 6 is a block diagram of the receiver and alarm circuit of the present invention.

DETAILED DESCRIPTION OF THE PREFERRED EMBODIMENT(S)

Referring to FIG. 1, an individual or user 10 is shown wearing a personal security alarm in accordance with the present invention which includes a hand unit 12 and a torso unit 14. As seen in this figure, the hand unit 12 is strapped around the palm 15 of user 10, and the torso unit 14 is engaged with the user's belt 16. Hand unit 12 must be strapped around the user's hand as shown since it contains a transmitter which is activated by the voluntary or involuntary clenching of the user's hand. The location of torso unit 14, however, is somewhat more arbitrary since it may be attached to any convenient portion of the torso. For example, torso unit 14 could be hung around the user's neck.

Referring to FIG. 2, the hand unit 12 includes a contoured housing 18, an elongated actuator button 20, and an elongated, elastic strap 22 attached to both ends to housing 18 and encircling the user's hand. As will be discussed subsequently, a short range transmitter is located within housing 18 which is activated by depressing actuator button 20.

In FIG. 3, a front elevational view of torso unit 14 is shown to include a housing 24, an enunciator portion 26, and an aperture 28 provided through the front wall of housing 24. As seen in the cross sectional view of FIG. 4, enunciator portion 26 includes a plurality of apertures 28 behind which an enunciator 30 is mounted.

Attached to the rear of housing 24 is an attachment member 32 which can be used to attach the torso unit 14 to belt 16, or to some other suitable support means. Also located within housing 24 is a circuit board 34, a dry cell battery 36, and a reset button 38. The reset button can only be accessed through aperture 28 of housing 24 by means of a thin, elongated tool such as the tip of a screwdriver 40.

Referring to FIG. 5*a*, a suitable circuit for hand unit 12 includes a battery 42, a short range, low-power transmitter 44, and a switch 46 attached to actuator button 20. When actuator button 20 is depressed, switch 46 permits battery 24 to energize transmitter 44 to produce a Radio Frequency (RF) signal 48.

In FIG. 5*b*, an alternate embodiment for the circuitry for hand unit 12 includes a mechanical-to-electrical transducer 50 coupled to a short range, low-power transmitter 52. The transducer can be of any suitable type well known in the art, including a magnet-and-coil generator assembly, a solenoid type transducer, or a piezoelectric type transducer. Mechanical energy is input to transducer 50 via actuator button 20 to cause a Radio Frequency (RF) pulse 54 to be produced by transmitter 52.

In FIG. 6, a preferred circuit for torso unit 14 includes a receiver 56, a latch 58, an alarm circuit 60, an audible enunciator 62, a dry cell battery 64, and an on/off switch 66. When switch 66 is closed, power is supplied to receiver 56, latch 58, and alarm circuit 60 by power lines 68.

Receiver 56 is responsive to the RF signals produced by the hand unit 12 and is operative to produce a detection signal on a line 70. Latch 58, which is responsive to the detection signal on line 70, produces a latched signal on line 72. When the latched signal on line 72 is input to alarm circuit 60, an alarm signal is produced on line 74 to cause enunciator 62 to produce an audible alarm.

Latch 58 will produce a continuous latched signal 72 upon the first occurance of a detection signal 70, causing enunciator 62 to emit a continuous alarm. To turn off the alarm, the screwdriver 40 or a similar probe must be placed through aperture 28 to contact reset button 38 to open switch 66.

In use, hand unit 12 is strapped around palm 14 of user 10 such that actuator button 20 is positioned over but facing away from the palm. Torso unit 14 is attached to any convenient portion of user's torso such as through the belt 16. A screwdriver or other probe 40 is inserted through aperture 28 to close switch 66 and activate the torso unit. If the user is attacked or if he or she should become injured such as by sudden heart attack, the voluntary or involuntary clutching of his or her fists will depress activator button 20 and set off enunciator 62 to summon help. The only way to turn off the alarm is to screwdriver 40 through aperture 28 to open switch 66. Since the on/off switch 66 is hidden and difficult to access, it is unlikely that an assailant will remain at the scene long enough to figure how to turn off the alarm.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A security alarm for an individual comprising:

a hand unit including transmitter means, actuating means operative to cause said transmitter means to produce a radio-frequency signal, and first attachment means for positioning said actuating means proximate the palm of a hand of said individual such that when said individual clenches said hand transmitter means is activated;

a torso unit including receiver means, alarm means responsive to said receiver means and operative to produce an audible alarm, and second attachment means for positioning said torso unit proximate the torso of said individual.

2. A security alarm as recited in claim 1 wherein said actuating means comprises a power supply, and switch means for coupling said power supply to said transmitter means.

3. A security alarm as recited in claim 2 wherein said hand unit further includes a housing for said transmitter means, switch means, and power supply, and wherein said first attachment means includes a strap attached to said housing adapted to encircle said individual's hand and hold said housing against said individual's palm.

4. A security alarm as recited in claim 3 wherein said housing is contoured to fit said individual's palm.

5. A security alarm as recited in claim 4 wherein said switch means includes an actuator button which extends substantially the entire length of said housing.

6. A security alarm as recited in claim 1 wherein said actuating means comprises a mechanical-to-electrical transducer.

7. A security alarm as recited in claim 6 wherein said mechanical-to-electrical transducer includes generator means having a permanent magnet and a coil.

8. A security alarm as recited in claim 6 wherein said mechanical-to-electrical transducer includes a piezoelectric device.

9. A security alarm as recited in claim 6 wherein said hand unit further includes a housing for said transmitter means, switch means, and power supply, and wherein said first attachment means includes a strap attached to said housing adapted to encircle said individual's hand and hold said housing against said individual's palm.

10. A security alarm as recited in claim 9 wherein said housing is contoured to fit said individual's palm.

11. A security alarm as recited in claim 10 wherein said switch means includes an actuator button which extends substantially the entire length of said housing.

12. A security alarm as recited in claim 1 wherein said torso unit further includes latching means responsive to said receiver means and operative to activate said alarm means.

13. A security alarm as recited in claim 12 wherein said latching means includes reset means operative to disable said latching means.

14. A security alarm as recited in claim 13 wherein said torso unit includes a housing, and wherein said reset means is activated by extending an elongated member through an aperture provided in said housing to contact a switch located within said housing.

15. A security alarm as recite in claim 14 wherein said second attachment means includes means for attaching said housing proximate to the waist of said individual.

16. A personal security alarm comprising:

short range transmitter means responsive to an actuating signal and operative to produce a radio frequency signal;

actuator means adapted to be strapped to a user's hand, said actuator means being operative to produce said actuating signal in response to mechanical pressure exerted by said hand;

short range receiver means responsive to said radio frequency signal and operative to produce a detection signal;

latch means responsive to said detection signal and a reset signal and operative to produce a latched signal; and alarm means responsive to said latched signal and operative to produce an audible alarm signal, said alarm means being adapted to attach proximate the torso of said user.

17. A personal security alarm as recited in claim 16 wherein said actuator means includes a power supply and a switch.

18. A personal security alarm as recited in claim 16 wherein said actuator means includes a mechanical-to-electrical transducer.

19. A personal security alarm as recited in claim 16 wherein said reset signal is developed by a hidden switch.

* * * * *